US008794386B2

(12) United States Patent
Keeling et al.

(10) Patent No.: US 8,794,386 B2
(45) Date of Patent: Aug. 5, 2014

(54) FOLDING FORKLIFT

(75) Inventors: Ariana Keeling, Durham, NC (US); Marc Celestini, Raleigh, NC (US); Sean Lanier, Raleigh, NC (US); Stefano Fenu, Cary, NC (US); Sarah Dyer, Cary, NC (US)

(73) Assignee: Cardinal Gibbons High School, Raleigh, NC (US)

( * ) Notice: Subject to any disclaimer, the term of this patent is extended or adjusted under 35 U.S.C. 154(b) by 227 days.

(21) Appl. No.: 13/175,474

(22) Filed: Jul. 1, 2011

(65) Prior Publication Data

US 2013/0006444 A1 Jan. 3, 2013

(51) Int. Cl.

| | |
|---|---|
| ***B66F 9/075*** | (2006.01) |
| ***B66F 9/20*** | (2006.01) |
| ***B66F 9/18*** | (2006.01) |
| ***B66F 9/06*** | (2006.01) |
| ***G06F 17/00*** | (2006.01) |
| ***G06F 7/70*** | (2006.01) |
| ***B62B 1/06*** | (2006.01) |

(52) U.S. Cl.

USPC ................. 187/233; 701/2; 701/50; 187/222; 187/236; 187/230; 414/607; 414/444

(58) Field of Classification Search

CPC ................ B66F 9/20; B66F 9/08; B66F 1/00; B66F 9/10; B66F 17/003; B66F 9/07563; B66F 9/082; B66F 9/06; B66F 9/16; B60G 17/005; B60G 2204/46; B60G 17/015; B60G 2400/252; B60G 2400/11; B60G 2400/60; Y02T 90/124; Y02T 90/16; Y02T 90/128; Y02T 90/121; Y02T 90/163; Y02T 90/168; Y02T 90/169; B60P 3/125; B60P 1/02; B60P 1/025; B60P 1/4407; B60P 1/00; B60P 1/43; B60P 1/04

USPC ......... 414/607, 636, 541, 490, 467, 631, 694, 414/277, 629, 642, 352; 703/8; 250/221; 340/572.8; 188/1.12; 212/347, 294, 212/299; 254/4; 74/490.05; 187/237, 229, 187/242, 243, 230, 222, 234, 223, 238, 187/274; 180/9.32, 208, 211, 266, 285, 180/282, 291, 333, 415, 411; 294/49; 280/755, 754, 834, 124, 5, 6, 89; 701/23, 50, 301, 408, 468

See application file for complete search history.

(56) References Cited

U.S. PATENT DOCUMENTS

| | | | | | |
|---|---|---|---|---|---|
| 2,176,731 | A | * | 10/1939 | Claire | 52/117 |
| 3,666,123 | A | * | 5/1972 | Tornheim | 414/557 |
| 3,727,781 | A | * | 4/1973 | Ramsey | 414/642 |
| 3,782,571 | A | * | 1/1974 | Murphy et al. | 414/635 |
| 4,016,992 | A | * | 4/1977 | Larsen et al. | 414/740 |
| 4,354,795 | A | * | 10/1982 | Dutra, Jr. | 414/622 |
| 4,365,921 | A | * | 12/1982 | Brouwer et al. | 414/347 |
| 4,371,046 | A | * | 2/1983 | Read | 175/57 |

(Continued)

*Primary Examiner* — Fadey Jabr
*Assistant Examiner* — Luis A Martinez Borrero
(74) *Attorney, Agent, or Firm* — Haynes and Boone, LLP

(57) ABSTRACT

A forklift apparatus includes a base that moves in a generally horizontal direction. The base carries a mast that includes a lower section and an upper section. The upper section pivots relative to the lower section between a first storage orientation and a second operating orientation. In the second operating orientation, the upper section forms an upward continuation of the lower section. The mast carries a lifting structure that can selectively engage an object. A drive structure moves the lifting structure in a generally vertical direction when the upper section is in the second operating orientation.

18 Claims, 6 Drawing Sheets

(56) References Cited

U.S. PATENT DOCUMENTS

| | | | | | |
|---|---|---|---|---|---|
| 4,431,083 | A * | 2/1984 | York | ............ | 187/226 |
| 4,476,960 | A * | 10/1984 | Yarris | ............ | 187/226 |
| 4,493,604 | A * | 1/1985 | Walker | ............ | 414/622 |
| 4,571,139 | A * | 2/1986 | Moseley et al. | ............ | 414/347 |
| 4,619,346 | A * | 10/1986 | Deguerry | ............ | 187/243 |
| 4,826,474 | A * | 5/1989 | Holmes | ............ | 414/699 |
| 5,180,275 | A * | 1/1993 | Czech et al. | ............ | 414/541 |
| 5,328,321 | A * | 7/1994 | Moffett et al. | ............ | 414/631 |
| 5,370,494 | A * | 12/1994 | Holmes et al. | ............ | 414/635 |
| 5,451,135 | A * | 9/1995 | Schempf et al. | ............ | 414/694 |
| 5,651,658 | A * | 7/1997 | Holmes et al. | ............ | 414/635 |
| 5,697,755 | A * | 12/1997 | McCauley et al. | ............ | 414/634 |
| 5,758,785 | A * | 6/1998 | Spinosa et al. | ............ | 212/300 |
| 6,010,299 | A * | 1/2000 | Jesswein | ............ | 414/743 |
| 6,029,779 | A * | 2/2000 | Kunz | ............ | 188/1.12 |
| 6,092,976 | A * | 7/2000 | Kamiya | ............ | 414/636 |
| 6,209,913 | B1 * | 4/2001 | Ishikawa et al. | ............ | 280/755 |
| 6,296,081 | B1 * | 10/2001 | Nagai et al. | ............ | 187/394 |
| 6,547,217 | B1 * | 4/2003 | Dygert | ............ | 254/8 R |
| 7,689,394 | B2 * | 3/2010 | Furem et al. | ............ | 703/8 |
| 7,704,035 | B2 * | 4/2010 | Borntrager et al. | ............ | 414/490 |
| 7,748,900 | B2 * | 7/2010 | Maschke | ............ | 378/198 |
| 7,974,736 | B2 * | 7/2011 | Morin et al. | ............ | 700/245 |
| 8,176,808 | B2 * | 5/2012 | Fisk et al. | ............ | 74/490.05 |
| 8,186,931 | B2 * | 5/2012 | Borntrager et al. | ............ | 414/490 |
| 8,583,313 | B2 * | 11/2013 | Mian | ............ | 701/28 |
| 2002/0117607 | A1 * | 8/2002 | Goddard | ............ | 250/221 |
| 2002/0134970 | A1 * | 9/2002 | Bressner et al. | ............ | 254/4 R |
| 2002/0189871 | A1 * | 12/2002 | Won | ............ | 180/9.32 |
| 2004/0076501 | A1 * | 4/2004 | McGill et al. | ............ | 414/607 |
| 2004/0101392 | A1 * | 5/2004 | Drake | ............ | 414/664 |
| 2004/0169167 | A1 * | 9/2004 | Reinelt et al. | ............ | 254/7 B |
| 2004/0226762 | A1 * | 11/2004 | Huther | ............ | 180/65.1 |
| 2005/0036864 | A1 * | 2/2005 | O' Keeffe | ............ | 414/467 |
| 2005/0220588 | A1 * | 10/2005 | Turnbull et al. | ............ | 414/467 |
| 2005/0265813 | A1 * | 12/2005 | Haney | ............ | 414/467 |
| 2006/0045708 | A1 * | 3/2006 | Bain et al. | ............ | 414/620 |
| 2006/0096941 | A1 * | 5/2006 | Stoetzer | ............ | 212/347 |
| 2006/0255954 | A1 * | 11/2006 | Sorenson et al. | ............ | 340/572.8 |
| 2007/0140817 | A1 * | 6/2007 | Hansl | ............ | 414/277 |
| 2007/0166138 | A1 * | 7/2007 | Brooks | ............ | 414/471 |
| 2007/0243052 | A1 * | 10/2007 | Fukudome et al. | ............ | 414/723 |
| 2007/0292252 | A1 * | 12/2007 | McGill et al. | ............ | 414/634 |
| 2008/0044265 | A1 * | 2/2008 | Borntrager et al. | ............ | 414/352 |
| 2008/0060880 | A1 * | 3/2008 | Finkbeiner | ............ | 187/237 |
| 2008/0116013 | A1 * | 5/2008 | Vandewinckel et al. | ............ | 187/229 |
| 2008/0184840 | A1 * | 8/2008 | Novoplanski et al. | ............ | 74/490.01 |
| 2008/0297590 | A1 * | 12/2008 | Barber et al. | ............ | 348/47 |
| 2009/0020368 | A1 * | 1/2009 | Bogelein et al. | ............ | 187/222 |
| 2009/0041564 | A1 * | 2/2009 | Borntrager et al. | ............ | 414/352 |
| 2009/0188038 | A1 * | 7/2009 | Raney | ............ | 5/87.1 |
| 2009/0294218 | A1 * | 12/2009 | Archer et al. | ............ | 187/237 |
| 2010/0068024 | A1 * | 3/2010 | Agens | ............ | 414/729 |
| 2010/0106344 | A1 * | 4/2010 | Edwards et al. | ............ | 701/2 |
| 2010/0122651 | A1 * | 5/2010 | Borum et al. | ............ | 114/259 |
| 2010/0183412 | A1 * | 7/2010 | Borntrager et al. | ............ | 414/541 |
| 2010/0263948 | A1 * | 10/2010 | Couture et al. | ............ | 180/8.2 |
| 2010/0294594 | A1 * | 11/2010 | Campbell et al. | ............ | 182/141 |
| 2011/0155483 | A1 * | 6/2011 | Couture et al. | ............ | 180/9.32 |
| 2012/0228064 | A1 * | 9/2012 | Busuttil et al. | ............ | 187/226 |
| 2012/0255810 | A1 * | 10/2012 | Yang | ............ | 187/222 |
| 2012/0263565 | A1 * | 10/2012 | O'Keeffe | ............ | 414/667 |

* cited by examiner

FOLDING FORKLIFT

BACKGROUND

Although the human hand is a remarkably useful structure for manipulating objects, there are times when manipulating an object by hand may be inappropriate or impossible. For example, an object may be excessively large, small, heavy, or dangerous. In other situations, a law, rule, or regulation may inhibit a human's ability to manipulate an object certain settings, for example, in a competition between machines. Although some machines can be used to manipulate objects, such machines can be large and unwieldy.

SUMMARY

In general, one aspect features a machine that includes a first beam coupled by a hinge to a second beam. The machine further includes a carnage operable to translate along an axis defined by the first beam and the second beam when their axes are relatively aligned. The hinge permits the first beam to rotate, relative to the second beam, thereby reducing the extent of the machine along at least a first dimension.

In some embodiments, the carriage is coupled to a chain that forms a substantially continuous loop around the first and second beams.

In some embodiments, the machine further includes a controller to control the operation of one or more motors that engage with the hinge and the carriage. The controller may allow the first beam to be selectively rotated about the hinge relative to the second beam. The controller may further allow the carriage to be translated along the first and second beams.

In some embodiments, the controller may allow for autonomous operation of the machine. In other embodiments, the controller may be coupled to a radio-frequency communications interface and allow for remote operation of the machine by a human.

BRIEF DESCRIPTION OF THE DRAWINGS

The present disclosure is best understood from the following detailed description when read with the accompanying figures. The drawings were prepared with Creo Elements from Parametric Technology Corporation. It is emphasized that, in accordance with the standard practice in the industry, various features are not drawn to scale. In fact, the dimensions of the various features may be arbitrarily increased or reduced for clarity of discussion. Furthermore, all features may not be shown in all drawings for simplicity.

DETAILED DESCRIPTION

The present disclosure relates generally to a machine for manipulating objects. It is understood, however, that the following disclosure provides many different embodiments, or examples, for implementing different features of the invention. Specific examples of components and arrangements are described below to simplify the present disclosure. These are, of course, merely examples and are not intended to be limiting.

Figure 1:
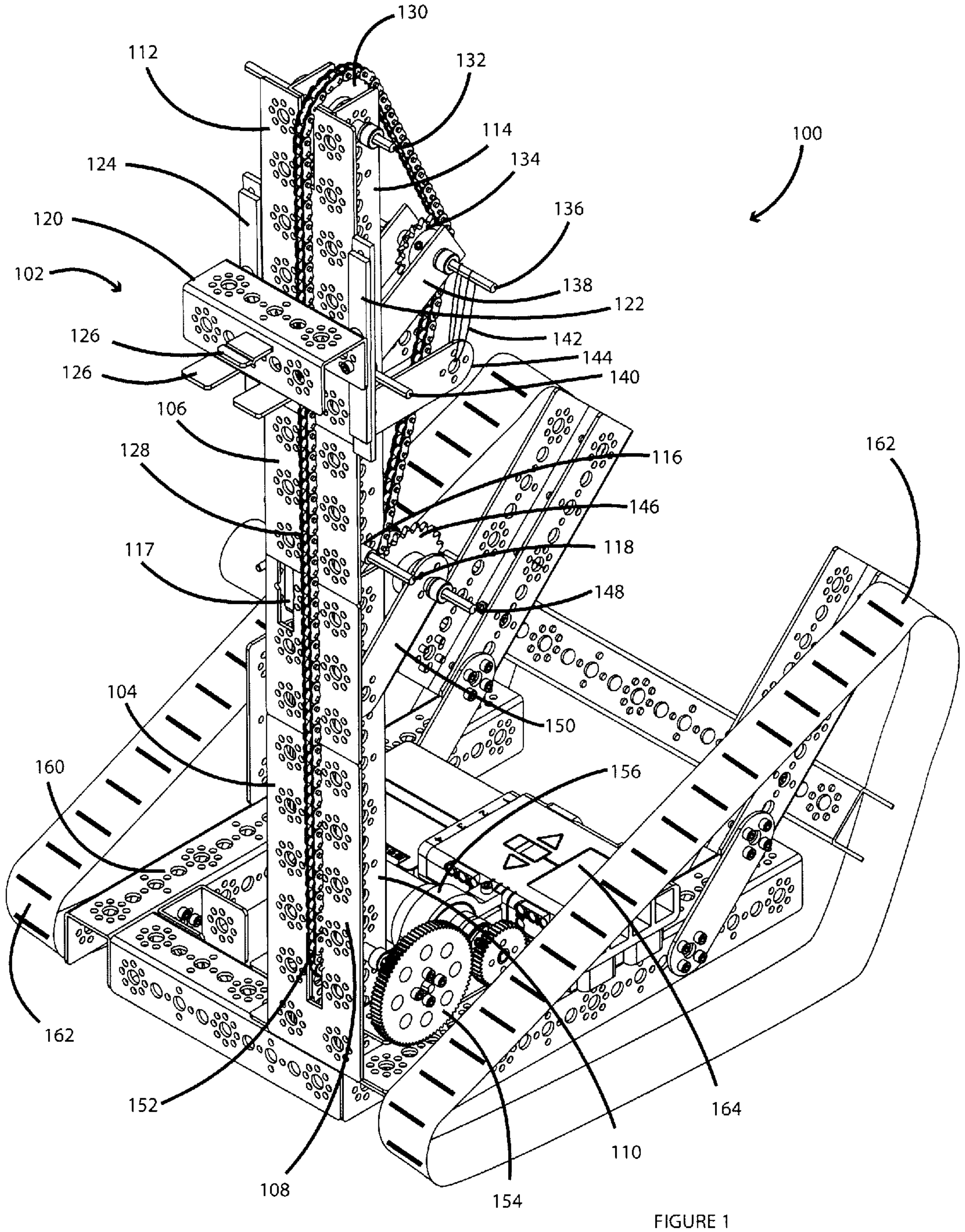
FIG. 1 illustrates one embodiment a machine equipped with a forklift apparatus.

Referring to FIG. 1, illustrated is one embodiment of a machine 100 equipped with a forklift apparatus 102. The forklift apparatus 102 includes a lower mast 104 and an upper mast 106. The lower mast 104 has two substantial portions, a car guide 108 and a structural support beam 110. The car guide 108 is a front-facing, substantially flat plate and is coupled to the support beam 110, which is a U-shaped beam. Other configurations are also possible. For example, in some embodiments, the structural support beam 110 may be a box beam, I-beam, may comprise multiple beams, or may have any other suitable configuration. Similarly, in other embodiments the car guide 108 may be a pair of equally-spaced rails or any other suitable structure. And in still other embodiments, the car guide 108 may be entirely absent.

The car guide 108 and the structural support beam 110 are aluminum, but they may be made from any suitable material. For example, the car guide 108 and the structural support beam 110 may be another metal, including without limitation examples such as steel, iron, titanium, and tin; wood; plastic; or any combination thereof. The car guide 108 may be coupled to the structural support beam 110 using any suitable technique, including for example threaded screws, nuts and bolts, welding, fusing, glue, or nails. In other embodiments, the car guide 108 and the structural support beam 110 may be cast or formed as a single integrated piece.

The upper mast 106 similarly includes a car guide 112 and a structural support beam 114. The design of these upper mast 106 components is preferably the same as their counterparts in the lower mast.

The upper mast 106 couples to the lower mast 104 at a hinge 116. The hinge 116 includes a pin 118 that passes axially through apertures in the structural support beams 110 and 114. The hinge 116 provides an articulation point between the upper mast 106 and the lower mast 104, allowing the upper mast 106 to rotate about the pin while the lower mast 104 remains relatively fixed in position. This articulation is further illustrated in the other figures. Affixed to the pin 118 is an articulation gear 117. A mast drive motor has a mast drive gear that meshes with the articulation gear 117 to cause the upper mast 106 to rotate about the pin 118. In this way, the upper mast 106 may be raised and lowered. In other embodiments, the upper mast 106 may be raised and lowered in other ways, including for example by one or more pneumatic or hydraulic cylinders, one or more springs, one or more chains or pulleys, one or more permanent or electro-magnets, or any combination thereof.

The forklift apparatus 102 further includes a carriage 120 that translates vertically along the car guides 108 and 112. The carriage 120 includes two carriage guides 122 and 124 that extend behind the car guides 108 and 112 on the opposite side of the carriage 120. The carriage guides 122 and 124 thus restrict the lateral movement of the carriage 120 and ensure that the carriage slides smoothly and only vertically. The carriage 120 is equipped with an attachment 126. The attachment 126 includes two lower fixed prongs and an upper spring prong suitable for capturing and securing a horizontally oriented cylindrical object of appropriate size, such as a baton. In other embodiments, the carriage 120 may include other attachments, either in addition to or in place of the attachment 126. Example attachments include sensors (including for example a magnetometer, microphone, or video or still image camera), traditional forklift forks, a grasping claw or clamp, a platform, a drum carrier, or any other suitable attachment. The attachment 126 may be detachably attached to the carriage 120 via any suitable mechanism, including for example one or more screws, pins, bolts, latches, hooks, or any combination thereof. The carriage 120 may include a plurality of coupling mechanisms or otherwise be equipped with a plurality of attachments 126.

The carriage 120 is driven along the car guides 108 and 112 by a drive chain 128. The drive chain 128 is a substantially continuous roller chain formed from interlocking links. The carriage 120 is preferably coupled to the drive chain 128 by a screw or bolt, but any other suitable coupling mechanism may also be used. The drive chain 128 situated to slide along the surface of car guides 108 and 112, although preferably the drive chain 128 minimal contact—or even no contact—with them. At the upper extremus of the upper car guide 112, the drive chain 128 engages with a sprocket 130 that is rotatably mounted to an axle 132 affixed to the upper structural support beam 114. In another embodiment, the sprocket 130 may be affixed to the axle 132 which, in turn, is rotatably mounted to the upper structural support beam 114. The sprocket 130 has teeth sized to match the links of the drive chain 128 and may be a 24-tooth sprocket. The sprocket 130 may rotate freely under the engagement of the drive chain 128 as the drive chain 128 moves the carriage 120 up and down the car guides 108 and 112.

Continuing to describe the path of the drive chain 128, from the sprocket 130 the drive chain 128 next engages with a tensioning sprocket 134 rotatably mounted on an axle 136 affixed to a tensioning lever 138. The tensioning sprocket 134 has teeth sized to match the links of the drive chain 128 and may be a 16-tooth sprocket. The tensioning lever 138 is rotatably mounted to the upper structural support beam 114 using a pin hinge 140. An elastically deformable loop 142 has a first end that exerts a biasing force on the axle 136, and inducing a torque on the tensioning lever 138 about the pin hinge 140. The torque on the tensioning lever 138, in turn, biases the tensioning sprocket 134 toward the drive chain 128 and away from the upper structural support beam 114. In this way, the tensioning sprocket 134 removes any excess slack in the drive chain 128 by lengthening the distance the drive chain 128 must traverse as it passes over the tensioning sprocket 134.

The elastically deformable loop 142 has a second end coupled to a fixed mounting point 144. The fixed mounting point 144 is immovably affixed to the upper structural support beam 114. In other embodiments, the fixed mount point 144 may be a point on the upper structural support beam 114. The elastically deformable loop 142 may be any suitable material and should be chosen to provide an appropriate level of tension on the drive chain 128. As one example, the elastically deformable loop 142 may be a rubber band of appropriate size and strength. In other embodiments, the elastically deformable loop 142 may be replaced with any other suitable biasing device, including, for example, a spring, pneumatic cylinder, or hydraulic cylinder.

Further in the description of the path of the drive chain 128, the drive chain 128 next transits to a hinge sprocket 146 that is affixed to an axle 148 on a bracket 150. The hinge sprocket 146 has teeth sized to match the links of the drive chain 128 and may be a 24-tooth sprocket. The hinge sprocket 146 may be rotatably mounted to the axle 148, or the axle 148 may be rotatably mounted to the bracket 150, or potentially both. Thus, the sprocket 146 may rotate freely under the engagement of the drive chain 128 as the drive chain 128 moves the carriage 120 up and down the car guides 108 and 112. The axle 148 may also be mounted to a second bracket to provide improved support. In other embodiments, the hinge sprocket 146 may be rotatably mounted to the pin 118. In still other embodiments, the sprocket 146 may be replaced with two sprockets, one each mounted to upper and lower structural supports 144 and 110 near the hinge 116.

Following the hinge sprocket 146, the path of the drive chain 128 continues to a sprocket 152 at the lower extremus of the lower car guides 108. The sprocket 152 has teeth sized to match the links of the drive chain 128 and may be a 24-tooth sprocket. The sprocket 152 is affixed to an axle that is further coupled to a gear 154 and chain drive motor 156. The chain drive motor 156 meshes with the gear 154 to provide motive force to the gear 154. The gear 154, which is affixed to the axle, transfers the motive force to the sprocket 152, causing the sprocket 152 to rotate and thereby move the drive chain 128 in either direction. The chain drive motor 156 is preferably a reversible DC drive motor, but any suitable type of motor may be used.

In some embodiments, the gear 154 may be absent, and the chain drive motor 156 may couple directly to the axle. In still other embodiments, the chain drive motor 156 may couple to the sprocket 152 through a gearbox that couples to the sprocket 152 or otherwise transfers rotational power to the sprocket 152.

From the sprocket 152, the path of the drive chain 128 continues along the surface of the lower car guide 108 and upper car guide 112 to the carriage 120. Thus, as previously noted, the drive chain 128 is a substantially continuous chain loop that is effective to transfer the rotational force provided by the chain drive motor to an axial force applied to the carriage 120, thus inducing a vertical translation of the carriage 120 up and down the car guides 108 and 112. By selectively applying power to the chain drive motor, the vertical position of carriage 120 can be adjusted as desired for any activity.

The forklift apparatus 102 is mounted on a base 160 equipped with treads 162. The treads 162 allow the machine 100 to be driven over a variety of even, semi-even, and uneven surfaces. In other embodiments, the base 160 may alternatively be equipped with any suitable locomotion mechanism, including for example any number of wheels or legs. The base 160 includes one or more suitable motors for driving the treads or other locomotion mechanism. In still other embodiments, the base 160 may be fixed in place.

The base 160 further includes a control module 164 for controlling the operation of the forklift apparatus 102 and, optionally, the treads 162 or other locomotion mechanism. The control module 164 produces one or more signals to control the operation of the chain drive motor and the mast drive motor. The control module 164 may also provide control signals for other operations of the machine 100. The control module 164 may include a programmable processor and a computer-readable memory storing instructions that, when executed by the programmable processor, produce the one or more signals that control the operation of the chain drive motor and the mast drive motor. The computer-readable memory may also be computer-writable. The control module 164 may further include a plurality of input, output, or input/output ports. Thus, the control module 164 may also receive as input signals from one or more sensors located on or in the machine 100. In one embodiment, the control module 164 includes a LEGO® MINDSTORMS® NXT Intelligent Brick available from the LEGO Group.

The control module 164 may further include one or more wired or wireless communications interfaces to allow for remote control and programming of the machine 100. For example, the control module 164 may include an 802.11b wireless communications adapter. In one embodiment, the control module 164 includes a Samantha Wi-Fi (IEEE 802.11b) module available in the FIRST Tech Challenge program. In other embodiments, the communications adapter may use another protocol or medium, including for example ZigBee, Bluetooth, IEEE 802.11, radio frequency, infrared, microwave, sonic, electrical, optical, or any other communications protocol or medium.

Figure 2:
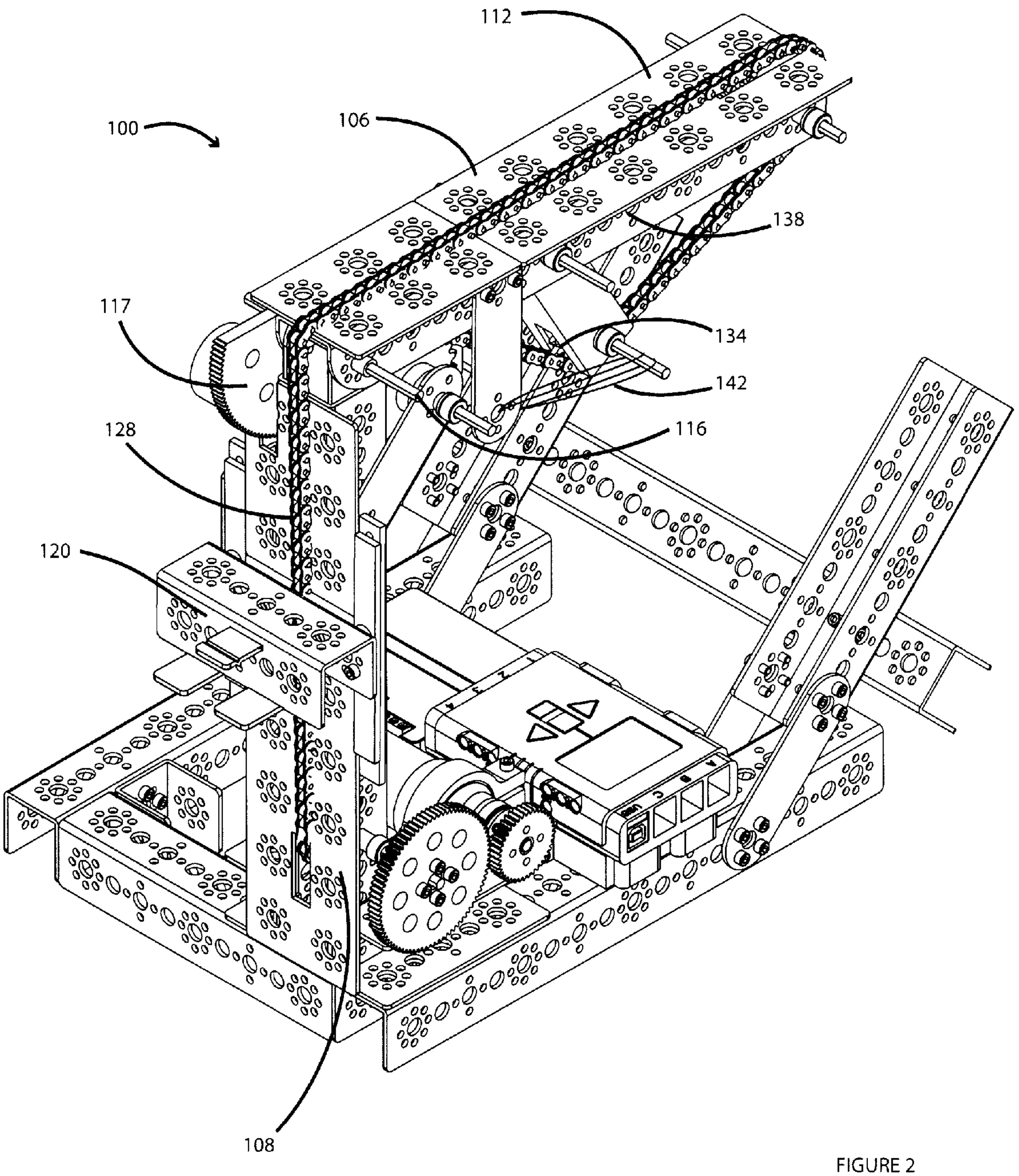
FIG. 2 illustrates an alternate view of a machine equipped with a forklift apparatus.

Turning now to FIG. 2, illustrated is the machine 100 in a different position as compared to FIG. 1. In FIG. 2, the upper mast 106 has been lowered by rotating about the hinge 116. When the upper mast 106 is in the lowered position, the drive chain 128 remains suitably taut due to the dynamic tension adjustment provided by the tensioning sprocket 134, tensioning lever 138, and elastically deformable loop 142. FIG. 2 also illustrates the carriage 120 located on the lower car guide 108. It is understood, however, that the carriage 120 may remain on the upper car guide 112 when the upper mast 106 is lowered. With the upper mast 106 in the lowered position, the articulation gear 117 protrudes through an aperture in the lower car guide 108.

Figure 3:
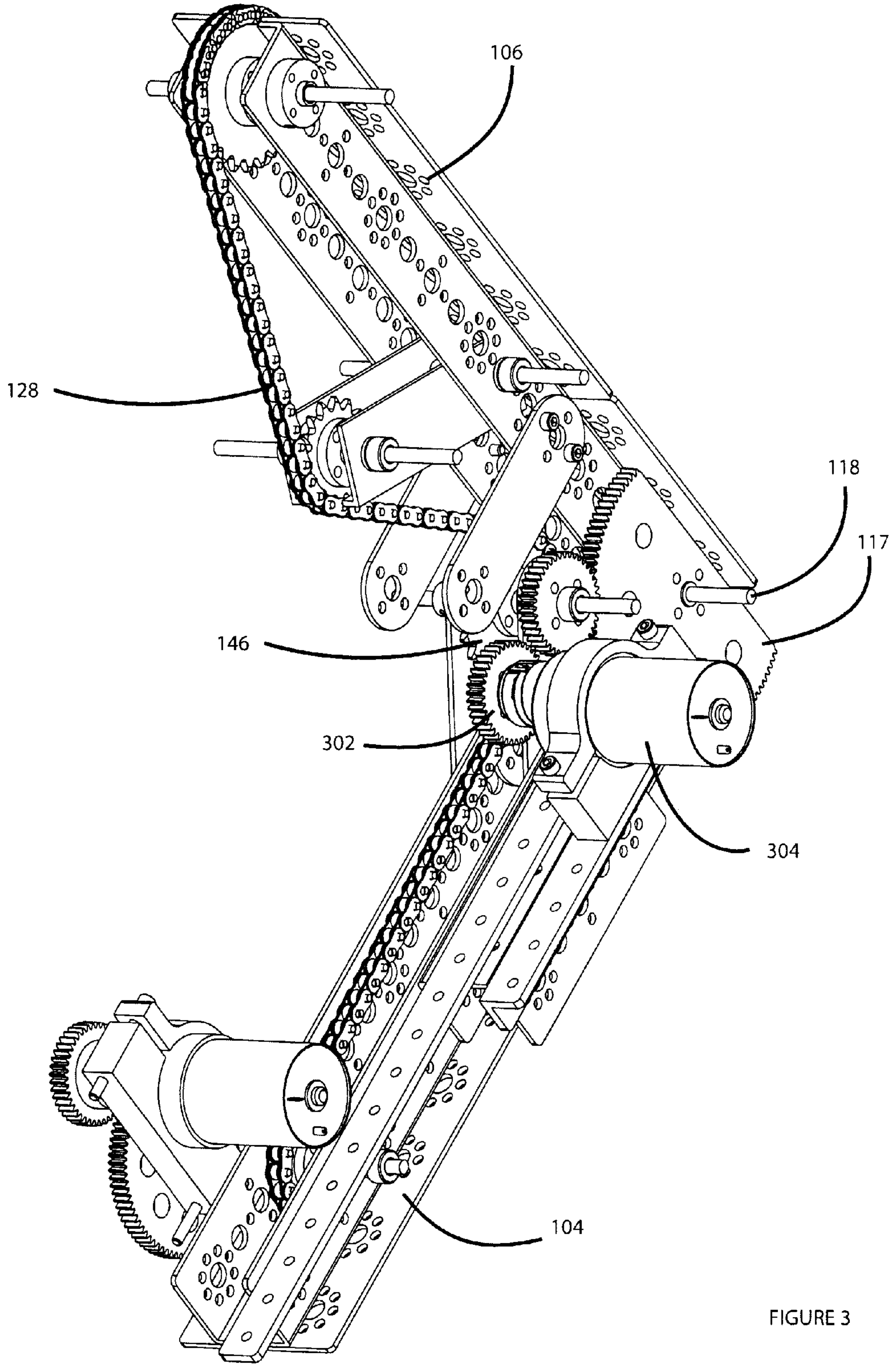
FIGS. 3, 4 and 5 illustrate alternate perspective views of one embodiment of a forklift apparatus.
Figure 4:
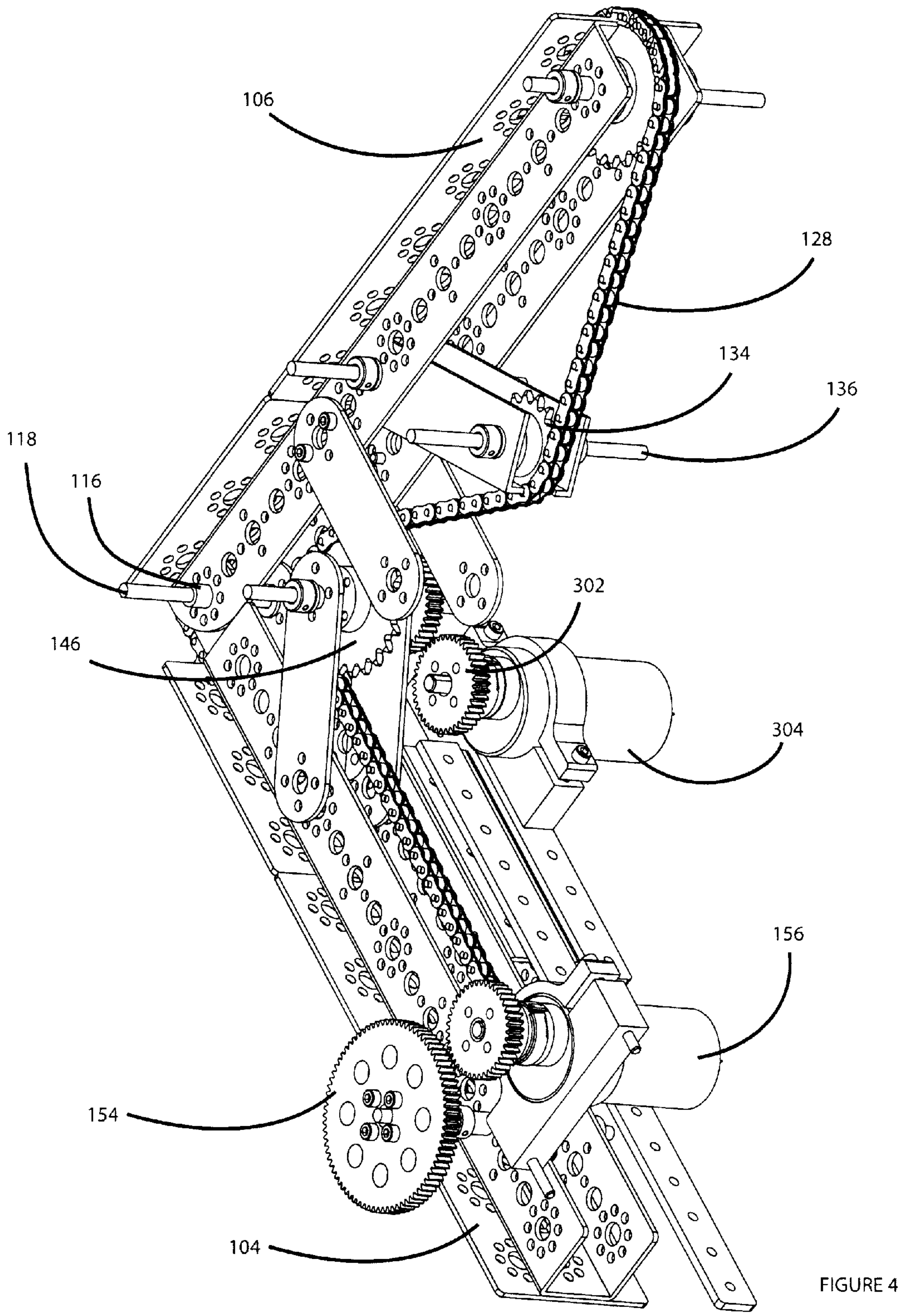
Figure 5:
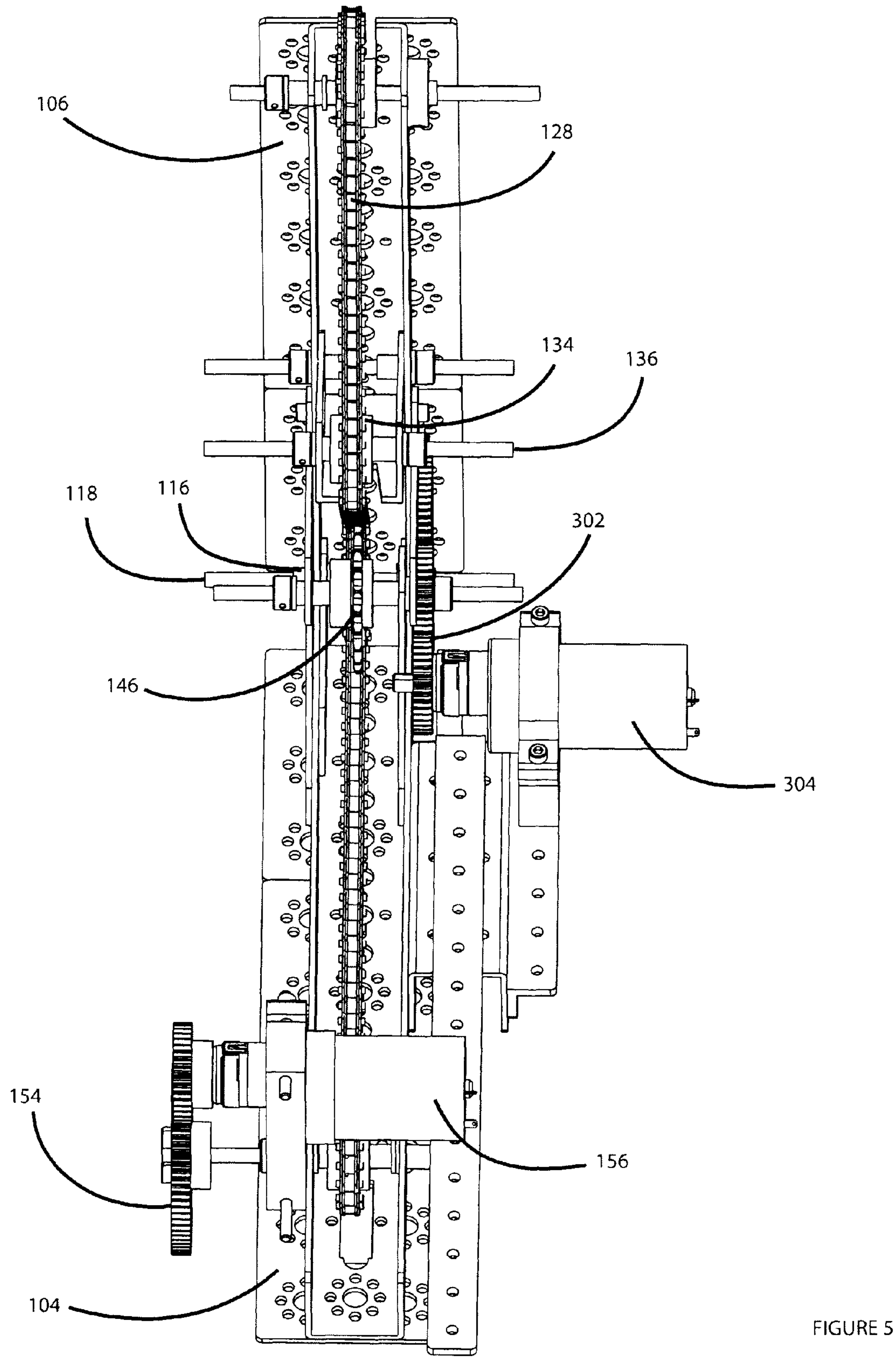

FIGS. 3, 4 and 5 illustrate alternate perspective views of one embodiment of a forklift apparatus. These figures further illustrate the mechanical features of the articulation point between the upper mast 106 and the lower mast 104. The articulation gear 117 is a generally large toothed wheel where a segment has been removed. The articulation gear 117 may be formed by cutting a segment off of a complete gear, or it may be directly formed in the appropriate shape. In one embodiment, the articulation gear 117 is formed from an 120-tooth gear, that is, there would be 120 teeth on the articulation gear 117 except that there are in fact less because a segment and its corresponding teeth have been removed.

The articulation gear 117 meshes with a mast drive gear 302 that is mounted to a mast drive motor 304. The mast drive gear 302 is a 40-tooth gear, and thus the mast drive gear 302 and the articulation gear 117 provide a 3:1 drive ratio. The mast drive motor 304 may be a reversible, 12-volt DC drive motor with a maximum speed of about 152 rpm. At maximum speed, the mast drive motor 304 makes about 2.5 revolutions per second, or one revolution in about 0.4 seconds. Since raising or lowering the upper mast 106 requires making a quarter revolution turn of the articulation gear 117 through the 3:1 drive ratio provided by the mast drive gear 302, the mast drive motor 304 can theoretically raise or lower the upper mast 106 in approximately (0.25 revolution)×(0.4 seconds/revolution)×(3:1 drive ratio)=0.3 seconds. In practice, the mast drive motor 304 begins from rest and thus does not immediately begin turning at 152 rpm. In addition, the mast drive motor 304 may achieve a maximum speed of less than 152 rpm due to the load imposed on it in raising or lowering the upper mast 106. However, the inventors have found that in practice, the upper mast 106 may be readily raised or lowered in less than about 1 second.

In other embodiments, any suitable type of motor may be used, and the mast drive motor 304 may engage the articulation gear 117 through a gearbox. Thus, the speed of raising or lowering the upper mast 106 may be faster or slower as may be desired for any particular application. And in still other embodiments, the mast drive gear 302 and articulation gear 117 may be replaced with suitable sprockets coupled by a chain.

The inventors have found that with the 3:1 drive ratio between the articulation gear 117 and mast drive gear 302, the mast drive motor 304 alone provides sufficient braking force to maintain the upper mast 106 in any position. Thus, once the upper mast 106 is moved to its raised position, there is no need to lock the upper mast 106 in position. Similarly, the upper mast 106 may be stopped and held in any arbitrary position in between its raised and lowered positions. In some embodiments, however, it may be desirable (for safety or other considerations) to provide a mechanical support or brake to held the upper mast 106 in a position. Alternatively, the mast drive motor 302 may be energized to provide a suitable force to counteract other forces, such as gravity, that may induce an undesirable movement of the upper mast 106.

The forklift apparatus 102 may be equipped with one or more sensors, each of which may be of a similar or dissimilar type. For example, the forklift apparatus 102 may include a camera, microphone, or both. As another example, the upper mast 106 may be equipped with a location sensor, which may operate to provide a signal indicative of the forklift apparatus 102's position using either relative or absolute positioning. In one embodiment, the location sensor may be a directional infrared sensor that detects the receipt of infrared energy transmitted by one or more fixed waypoints. In another embodiment, the location sensor may be a GPS, GLONASS, or other suitable location sensor. The location sensor may provide one or more signals indicative of position to the control module 164.

Various components of the machine 100, including for example at least some of the sprockets, the drive chain 128, and the drive motors, may be obtained from the LEGO GROUP as part of their TETRIX line of robotic components.

Software

As previously discussed, the machine 100 is equipped with a control module for controlling its operation. The control module preferably includes a programmable processor and a computer-readable memory storing instructions executable by the processor.

The control module may include an input allowing instructions for controlling the machine 100 to be received from a remote location. The input may be via any suitable input interface, including for example a Universal Serial Bus (USB), Bluetooth, or IEEE 802.11 interface. In this manner, the machine 100 may be remotely controlled through a wired or wireless connection. When instructions are received through the interface, a threshold filter may be applied to prevent initiating movement in response to a noise produced by the source of the instructions. For example, if the absolute value of the requested movement speed is less than a selected value, such as 10, then the requested movement may be discarded as unintentional noise. As another example, the control module may ignore a request to move the carriage 120 when the upper mast 106 is in the lowered position or is otherwise not in the raised position.

Figure 6:
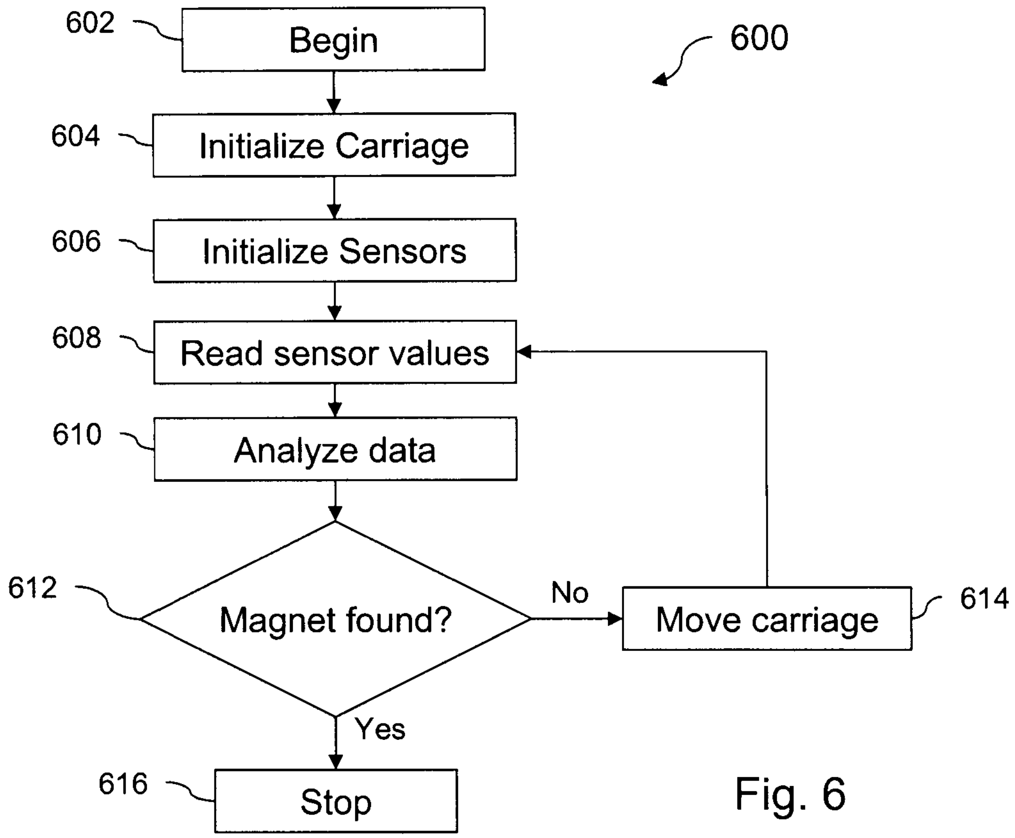
FIG. 6 illustrates a method for automatically moving a carriage into alignment with a target location.

The control module may include instructions allowing the machine 100 to operate autonomously. For example, the instructions may include instructions for moving the carriage 120 in response to data provided by a sensor mounted on the carriage 120. As one example, FIG. 6 illustrates a method 600 for automatically moving the carriage 120, when equipped with a magnetometer, into alignment with a target location identified by a magnetic field. As previously discussed, the carriage 120 may be equipped with one or more magnetometers to provide data indicative of the magnetic field near the carriage 120.

The method 600 begins in step 602. At step 604, the carriage is initialized by moving the carriage to a known location, for example, to the top or bottom of the forklift apparatus. In some embodiments, the step 604 may be omitted. Next in step 606, the magnetometer sensors are initialized by clearing out any previously read values and preparing the sensors to take new readings. Then in step 608, a measured value is read from the magnetometer sensors. If the carriage 120 is equipped with multiple sensors, each sensor reading may be read sequentially. The measured values from the sensors may be stored in a array.

Continuing to step 610, the data obtained from the magnetometer sensors is analyzed to determine whether one or more of the measured values indicates the presence of a magnetic field. In one embodiment, each measured value is compared to a threshold value, which may be predetermined. The threshold value may be selected to correspond to a magnetic field of a particular strength, for example, the strength of a magnetic field within about 2 to 3 inches from a given type of magnet. In other embodiments, other forms of data analysis may be performed.

Then in step 612, it is determined whether the data analysis performed in step 610 indicates that a magnet has been found. If no magnet has been found, then the process proceeds to step 614, where the carriage is moved. The carriage may be moved in a uniform direction a predetermined distance or for a predetermined amount of time, although other possibilities are also contemplated. The carriage may be moved, for example, by activating the carriage drive motor to turn a sprocket engaged with the drive chain. After the carriage has been moved, the process returns to step 608. In some embodiments, the steps 608 to 614 may occur simultaneously, such that data from the magnetometer sensors is substantially continuously analyzed as the carriage moves in a uniform direction.

If in step 612 it is determined that a magnet has been detected, then the process proceeds to step 616, where the process ends. In this way, the carriage may be automatically aligned with a target location identified by a magnet producing a magnetic field. In other embodiments, other types of sensors may be used, including for example, sensors providing indications of light, sound, distance, or temperature. The method 600 may be readily used with these other types of sensors to similarly automatically align the carriage with a target location identified by measurements taken from such sensors.

The present disclosure has been described relative to a preferred embodiment. Improvements or modifications that become apparent to persons of ordinary skill in the art only after reading this disclosure are deemed within the spirit and scope of the application. For example, the forklift apparatus has been described as having a generally vertical orientation, but it is understood that the forklift apparatus may alternatively be mounted in a horizontal, inverted, or any other orientation.

It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

We claim:

1. A forklift apparatus comprising:

a base structure selectively movable along a generally horizontal support surface;

a mast carried by the base structure for movement therewith, the mast comprising:

a vertically extending lower longitudinal section; and a vertically extending upper longitudinal section pivotal relative to the lower longitudinal section between a first storage orientation and a second operating orientation, wherein in the second operating orientation, the upper longitudinal section forms an upward continuation of the lower longitudinal section;

a lifting structure carried by the mast for movement along the length of the lower longitudinal section and upper longitudinal section, the lifting structure being operative to selectively engage an object and lift or lower the engaged object along the length of the mast; and a drive structure operative to selectively move the lifting structure along at least a portion of the lower longitudinal section and upper longitudinal section when the upper longitudinal section is in the second operating orientation.

2. The forklift apparatus of claim 1 wherein the drive structure comprises a motor-driven chain extending along the length of the mast, and wherein the forklift apparatus further comprises a tensioning sprocket that engages with the chain and operative to bias the chain with a tensioning force sufficient to remove slack from the chain when the upper longitudinal section is in the first storage orientation and the second operating orientation.

3. The forklift apparatus of claim 2 wherein the tensioning sprocket is attached to a lever that is pivotally secured to the mast, and wherein the bias force is developed by an elastically deformable member attached to the lever and to a fixed location on the mast.

4. The forklift apparatus of claim 1 further comprising a mast adjustment structure operative to selectively vary the angle between the lower longitudinal section and the upper longitudinal section.

5. The forklift apparatus of claim 4 further comprising a controller encoded with executable instructions for remotely activating the mast adjustment structure.

6. The forklift apparatus of claim 1 further comprising a release structure selectively operable to release an object from the lifting structure.

7. The forklift apparatus of claim 1 further comprising an object sensor operatively associated with the lifting structure.

8. The forklift apparatus of claim 1 wherein the forklift apparatus is remotely controllable via radio frequency communications.

9. An apparatus for lifting a load, comprising:

a movable base;

a mast comprising upper and lower sections carried by the base;

a hinge partitioning the upper section from the lower section and permitting the upper section to articulate between a folded state and an operating state;

a carriage;

an object engagement structure, carried by the carriage for movement therewith and operative to engage and hold a load; and a drive structure operative to selectively move the carriage along the mast.

10. The apparatus of claim 9 wherein the apparatus further comprises an additional drive structure operative to articulate the upper mast section between the folded state and the operating state.

11. The apparatus of claim 9 wherein the upper mast section in the folded state is generally transverse to the lower mast section, and the upper mast section in the operating state is substantially parallel to the lower mast section.

12. The apparatus of claim 9 wherein the carriage moves in a direction that is generally perpendicular to a movement of the movable base.

13. The apparatus of claim 9 wherein the drive structure operative to selectively move the carriage along the mast comprises a motor-driven chain extending substantially the entire length of the mast, and wherein the apparatus for lifting a load further comprises a tensioning apparatus operative to bias the chain with a tensioning force when the upper mast section in the folded state and when the upper mast section in the operating state.

14. The apparatus of claim 9 further comprising a release structure selectively operable to release an object from the lifting structure.

15. The apparatus of claim 9 further comprising an object sensor operatively associated with the object engagement structure.

16. The apparatus of claim 15 further comprising machine-readable instructions that, when executed by a computer, cause the computer to perform steps comprising:

initializing the location of the object engagement structure;

initializing the object sensor;

obtaining a sensed value from the object sensor;

determining whether the sensed value indicates that the object engagement structure is located at a desired location;

if the object engagement structure is not at a desired location, moving the object engagement structure in a uniform direction along the mast and repeating the obtaining and determining steps;

if the object engagement structure is at a desired location, stopping movement of the object engagement structure.

17. The apparatus of claim 16 wherein the machine-readable instructions further cause the computer to perform steps comprising:

when the object engagement structure is at a desired location, engaging a desired object.

18. The apparatus of claim 9 wherein the apparatus is remotely controllable by radio frequency communications.

* * * * *